US011751681B2

(12) United States Patent
Jiang

(10) Patent No.: US 11,751,681 B2
(45) Date of Patent: Sep. 12, 2023

(54) SOLAR OUTDOOR MULTIFUNCTIONAL FOLDING TABLE

(71) Applicant: Chenhui Jiang, Jiangxi (CN)

(72) Inventor: Chenhui Jiang, Jiangxi (CN)

( * ) Notice: Subject to any disclaimer, the term of this patent is extended or adjusted under 35 U.S.C. 154(b) by 0 days.

(21) Appl. No.: 17/672,706

(22) Filed: Feb. 16, 2022

(65) Prior Publication Data

US 2023/0255347 A1 Aug. 17, 2023

(51) Int. Cl.

| | |
|---|---|
| ***A47B 37/04*** | (2006.01) |
| ***A47B 3/00*** | (2006.01) |
| ***A47B 21/06*** | (2006.01) |
| ***A47G 11/00*** | (2006.01) |
| ***H02S 30/20*** | (2014.01) |
| ***H02S 40/34*** | (2014.01) |
| ***H02S 30/10*** | (2014.01) |

(52) U.S. Cl.

CPC .............. *A47B 37/04* (2013.01); *A47B 3/002* (2013.01); *A47B 21/06* (2013.01); *A47G 11/003* (2013.01); *H02S 30/10* (2014.12); *H02S 30/20* (2014.12); *H02S 40/34* (2014.12); *A47B 2021/066* (2013.01); *A47B 2200/008* (2013.01)

(58) Field of Classification Search

CPC ........... A47B 37/04; A47B 3/02; A47B 21/06; A47B 13/08; A47B 37/00; A47B 2021/066; A47B 2200/008; A47G 11/003; H02S 31/10; H02S 31/20; H02S 40/34

See application file for complete search history.

(56) References Cited

U.S. PATENT DOCUMENTS

| | | | | |
|---|---|---|---|---|
| 9,859,748 | B2 * | 1/2018 | Wang | H01L 31/042 |
| 10,840,849 | B2 * | 11/2020 | Belverio | A47B 23/001 |
| 2010/0064945 | A1 * | 3/2010 | Sierenberg | A47B 37/04 108/50.02 |
| 2014/0009103 | A1 * | 1/2014 | Nita | H02J 7/35 320/101 |
| 2014/0217954 | A1 * | 8/2014 | Wilde | H02J 7/35 320/101 |

(Continued)

FOREIGN PATENT DOCUMENTS

CN 212185704 U * 12/2020

OTHER PUBLICATIONS

English translation of CN 212185704 from espacenet (Year: 2023).*

*Primary Examiner* — Daniel J Rohrhoff

(57) ABSTRACT

The invention discloses a solar outdoor multifunctional folding table, wherein the solar desktop is composed of multiple photovoltaic panels hinged to one another, when user needs to supply power, the photovoltaic panels are unfolded and installed on desktop support frame and face the sun, and the photovoltaic panels generate corresponding solar power sources, and after control output module has performed processing, the user can connect electronic devices to output terminal of the control output module, thereby overall power-saving and environment-friendly effects are achieved. When the electric quantity of electronic devices is sufficient, user can turn over solar desktop, and the surface with fabric tablecloth of the photovoltaic panel faces upwards, and various articles can be placed on the solar table top, and people can work on the solar desktop. Moreover, the desktop support frame and photovoltaic panels can be folded and stored each other, greatly reducing the occupied space.

8 Claims, 5 Drawing Sheets

(56) References Cited

U.S. PATENT DOCUMENTS

| | | | | |
|---|---|---|---|---|
| 2015/0216273 A1* | 8/2015 | Akin | H02S 30/20 | |
| | | | 29/890.033 | |
| 2018/0123509 A9* | 5/2018 | Wang | H02J 7/35 | |
| 2022/0306324 A1* | 9/2022 | Murphey | H02S 30/10 | |

* cited by examiner

SOLAR OUTDOOR MULTIFUNCTIONAL FOLDING TABLE

TECHNOLOGY FIELD

The invention relates to the field of folding table, in particular to a solar outdoor multifunctional folding table.

BACKGROUND ART

With the improvement of the economic income of residents, people's living standards and the scope of activities are getting larger and larger, outdoor leisure and entertainment activities have been favored by the masses, there are more and more activities, and the activity time is getting longer and longer. To facilitate outdoor dining, many people bring a portable folding table that can be used as a dining table when eating and an entertainment table or tea table when not eating. In order to enrich outdoor entertainment activities, many people often bring some portable electronic devices, such as audio equipment, laptops, IPAD, mobile phones and so on. Due to the long time of outdoor activities, emergency power supply should be configured when using audio equipment, laptop computer, IPAD and mobile phone for a long time, however, the use time is limited by the capacity of emergency power supply. In the prior art, the outdoor portable folding tables on the market are simple in structure, easy to carry, and have a single function, which can basically meet the use of traditional outdoor activities, but cannot meet the requirements of powering or charging mobile electronic devices during outdoor activities. Although solar panels can generate electricity, solar panels are fragile, inconvenient to transport and carry, prone to safety problems, and the reliability of equipment operation cannot be guaranteed. In view of the above problems, there is an urgent need to develop a table that can supply power or charge mobile devices, and can also satisfy people's outdoor activities. Therefore, many manufacturers and people of insight to develop and research, but there is no more satisfactory products come out.

SUMMARY OF THE INVENTION

In order to solve the above problems, the invention provides a solar outdoor multifunctional folding table, which is simple in structure, can display temperature and orientation in real time, saves electricity, is environmentally friendly and energy-saving, to realize the function of outdoor power supply.

The invention can be achieved by adapting the following technical schemes:

A solar outdoor multifunctional folding table, comprising a solar desktop, a desktop support frame for supporting the solar desktop, wherein the solar desktop comprises a control output module, multiple photovoltaic panels on the same horizontal plane, the adjacent photovoltaic panels are hinged through articulation pieces, and the back of each photovoltaic panel is attached with a fabric tablecloth, the solar desktop is detachably arranged on the desktop support frame, and the fabric tablecloth is faced to the desktop support frame, the desktop support frame is individually assembled or multi-component assembled based on the solar desktop composed of several hinged photovoltaic panels, wherein the control output module comprises a control housing, a main control board, a converter, and an output port, the main control board and the converter are arranged in the control housing, and the output port is arranged on the surface of the control housing; the outer surface of the control housing is covered with a soft box body, wherein one side of the soft box body is hinged to the solar desktop; output end of multiple photovoltaic panels are connected to input end of the main control board, and output end of the main control board is connected to the output port through the converter.

Further, the soft box body is made from flexible material, an opening of one end of the soft box body is provided with a tab that can be turned up and down, wherein the tab and one side of the output port is provided with a convex section that is fully occluded with a concave section of the output port to achieve sealing; an iron sheet is arranged in the fabric tablecloth, and the surface of the soft box body is provided with a magnet stone which is magnetically attached to the iron sheet in the fabric tablecloth;

Further, one side of the desktop support frame is provided with a temperature measuring device and a direction designation device respectively.

Further, the articulation piece comprises hinges, and a hollow cavity is provided in the hinge, and an articulation rod is arranged in the hollow cavity, wherein the hinge is arranged on both sides of each photovoltaic panel, and the two adjacent sides of the two photovoltaic panels share one hinge; wherein front and rear ends of the hinges located on both sides of the solar desktop are provided with first openings, and front and rear ends of the hinges in the middle of the solar desktop are provided with second openings; the desktop support frame comprises first assembly parts detachably equipped at the first openings and sleeved on the articulation rod, and second assembly parts detachably equipped at the second openings and sleeved on the articulation rod, wherein the lower ends of the first assembly parts and that of the second assembly parts are provided with vertical rods extending in the vertical direction, and the two sides of the second assembly parts at front end of the solar desktop are respectively connected with the two first assembly parts at front end of the solar desktop through horizontal rods extending in the horizontal direction; the two sides of the second assembly parts at rear end of the solar desktop are respectively connected with the two first assembly parts at rear end of the solar desktop through horizontal rods extending in the horizontal direction; and the horizontal rods are arranged at bottom of the solar desktop.

Further, the desktop support frame also comprises multiple third assembly parts, multiple first diagonal rods, multiple second diagonal rods, multiple third diagonal rods and multiple fourth diagonal rods, the third assembly parts are connected to the end of each vertical rod away from the solar desktop, wherein the first assembly parts and the second assembly parts at the front end of the solar desktop are all connected to the corresponding third assembly part at the rear end of the solar desktop through the first diagonal rods, the first assembly parts and the second assembly parts at the rear end of the solar desktop are all connected to the corresponding third assembly part at the front end of the solar desktop through the second diagonal rods; two sides of the second assembly parts at the front end of the solar desktop are respectively connected to third assembly parts at two sides of the front end of the solar desktop through the third diagonal rods; two sides of the second assembly parts at the rear end of the solar desktop are respectively connected to the two third assembly parts at rear end of the solar desktop through the third diagonal rods; the third assembly part in the middle of the front end of the solar desktop is connected with the two first assembly parts on two sides of the front end of the solar desktop through the fourth diagonal rods; the third assembly part in the middle of the rear end of the solar desktop is connected with the two first assembly parts on two sides of the rear end of the solar desktop through the fourth diagonal rods.

Further, the top end of the first assembly parts and the top end of the second assembly parts are provided with assembling slots for assembling with the articulation rods, and one side of the first assembly parts and both sides of the upper end of the second assembly parts are provided with the horizontal slots for assembling with the horizontal rods, the lower end of the first assembly parts and the lower end of the second assembly parts are both provided with vertical slots; wherein the back the first assembly parts at front end of the solar desktop and the back the second assembly parts at front end of the solar desktop are provided with first diagonal rod slots for assembling with first diagonal rods, wherein the surface of the first assembly parts at rear end of the solar desktop and the surface of the second assembly parts at rear end of the solar desktop are provided with second diagonal rod slots for assembling with the second diagonal rods, both sides of each second assembly part are provided with third diagonal rod slots for assembling with the third diagonal rods, one side of each first assembly part is provided with fourth diagonal rod slot for assembling with the fourth diagonal rods.

Further, the solar outdoor multifunctional folding table also comprises a bearing grid, the bearing grid comprises a bottom web placed horizontally, multiple connection blocks, wherein one end of the connection blocks is sleeved on the horizontal rods or hanged on diagonal rods by hooks, the other end of the connection blocks is vertically connected to the bottom web or hanged on diagonal rods at the other end by hooks.

Further, two or more first assembly parts are provided with installation slot, wherein the temperature measuring device is detachably arranged in the installation slot on one of the first assembly parts, and the direction designation device is arranged in any other installation slot on one of the first assembly parts.

Further, the desktop support frame comprises third assembly parts, multiple first diagonal rods, multiple second diagonal rods, multiple third diagonal rods and multiple fourth diagonal rods, and the desktop support frame is assembled individually or multi-component according to the solar desktop composed of two or more photovoltaic panels adjacent to each other.

Further, the fabric tablecloth is a high temperature resistant, waterproof, waterproof and insulating material.

The advantageous effects of the invention:

1. The solar desktop is detachably arranged on the desktop support frame, and due to the fact that the solar desktop is composed of the multiple photovoltaic panels which are hinged to one another, when a user needs to supply power, the photovoltaic panels are unfolded and installed on the desktop support frame and face the sun, that is, the photovoltaic panels generate the corresponding solar power sources, and after a control output module has performed processing, the user can connect to an output terminal of the control output module for an outdoor power supply for an electronic device, the overall power-saving and environment-friendly effects are achieved, the structural design is reasonable, and the travel of people is greatly facilitated.

2. When the electric quantity of the electronic equipment is sufficient, a user can turn over the solar desktop, that is, the surface, with the fabric tablecloth, of the photovoltaic panel faces upwards, thereby the photovoltaic panel is more attractive, and various articles can be placed on the solar table top, and people can work on the solar desktop.

3. Wherein the main control board, the converter, and the output port can arranged inside the control housing, the outer surface of the control housing is covered with a soft box body, wherein one side of the soft box body is hinged to the solar desktop, the soft box body is made from flexible material, an opening of one end of the soft box body is provided with a tab that can be turned up and down, wherein the tab and one side of the output port is provided with a convex section that is fully occluded with a concave section of the output port to achieve sealing, which facilitates storage, and can prevent dust from entering into the control output module and causing it to fail to work normally; when using the output end of the control housing in the soft box body, the tab is turned downward, thereby the output end can be used to charge the electronic equipment; the surface of the soft box body is provided with magnet stone which is magnetically attached to the iron sheet in the fabric tablecloth; when not in use, the control output module in the soft box body can be attached to the iron sheet in the fabric tablecloth through the magnet stone to achieve the storage effect, that is, there will be no swing.

4. The solar desktop in the application is composed of the multiple photovoltaic panels which are hinged to one another, and the desktop support frame can be folded and stored, that is, in non-working state, the desktop support frame and photovoltaic panels can be folded and stored, greatly reducing the occupied space, in addition, separate arrangement can be convenient for maintenance.

5. The temperature measuring device and the direction designation device provided in the invention can allow users to intuitively real-time temperature and direction; and the temperature measuring device in the invention can be disassembled from the desktop support frame and used separately, which is more convenient and fast.

6. The desktop support frame can be individually assembled or multi-component assembled based on the solar desktop composed of several hinged photovoltaic panels, which facilitates people to choose different power generation products according to the environment.

BRIEF DESCRIPTION OF ACCOMPANYING DRAWINGS

In order to facilitate the understanding of the technical personnel skilled in the art, the invention is further described in combination with the accompanying drawings.

MAIN COMPONENT SYMBOL DESCRIPTION

In the accompanying drawings: 1. solar desktop; 11. photovoltaic panel; 12. hinge; 13. articulation rod; 14. second opening; 15. first opening; 16. control output module; 161. tab; 162. soft box body; 2. desktop support frame; 21. first assembly part; 211. installation slot; 22. second assembly part; 23. vertical rod; 24. horizontal rod; 25. first diagonal rod; 26. second diagonal rod; 27. third diagonal rod; 28. fourth diagonal rod; 29. third assembly part; 31. bottom web; 32. connection block; 33. direction designation device; 34. temperature measuring device.

SPECIFIC EMBODIMENTS OF THE INVENTION

The following is a clear and complete description of the technical scheme of the invention in combination with embodiments, obviously, the described embodiments are only part of the embodiments of the invention, but not all embodiments. Based on embodiments of the invention, all other embodiments obtained by ordinary technical personnel skilled in the art without making creative labor should fall within the protection scope of the invention.

Figure 1:
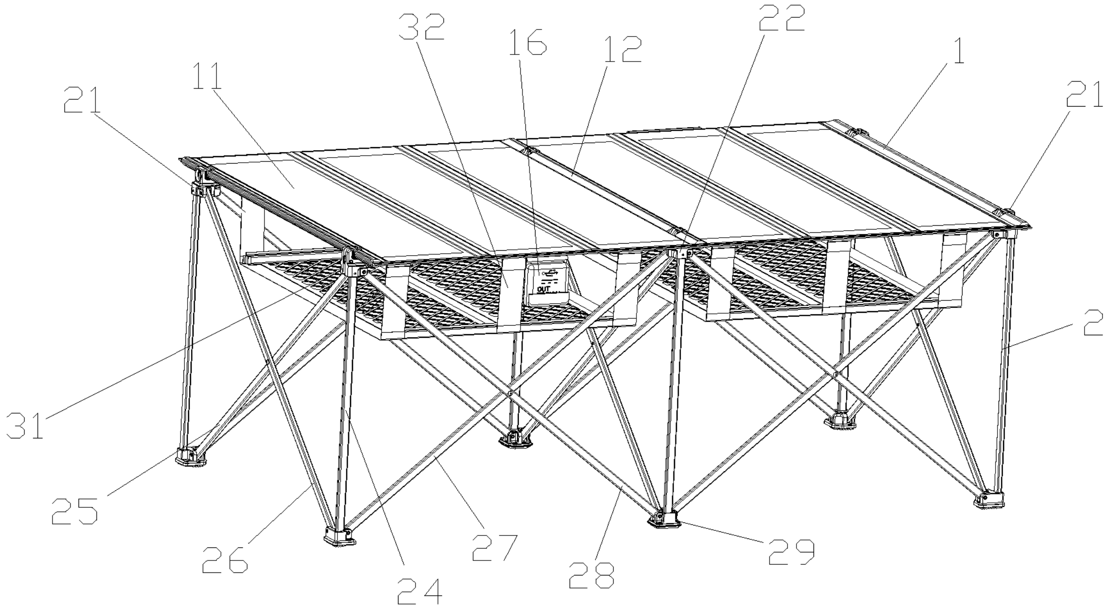
FIG. 1 shows the stereo structure of the solar outdoor multifunctional folding table in the invention.
Figure 2:
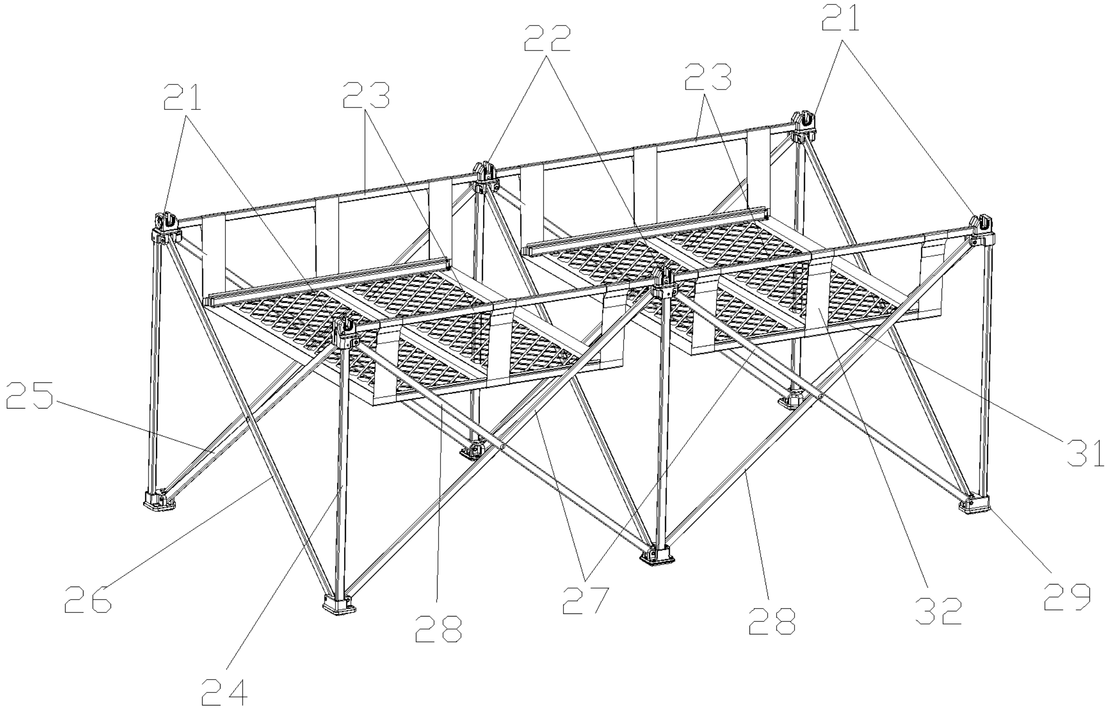
FIG. 2 shows the stereo structure of the desktop support frame in the invention.
Figure 3:
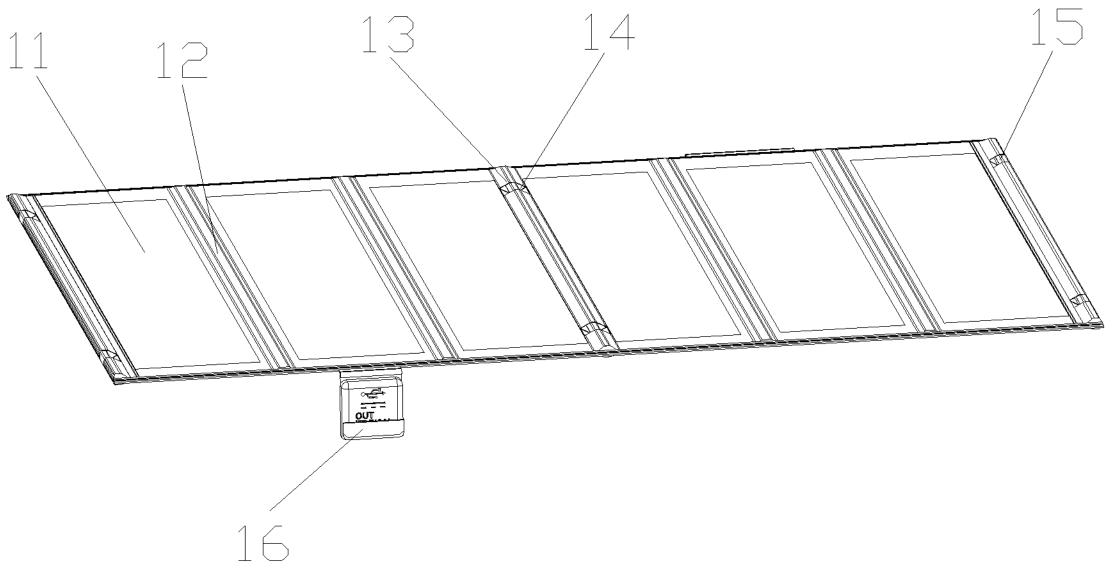
FIG. 3 shows the stereo structure of the solar desktop in the invention.
Figure 4:
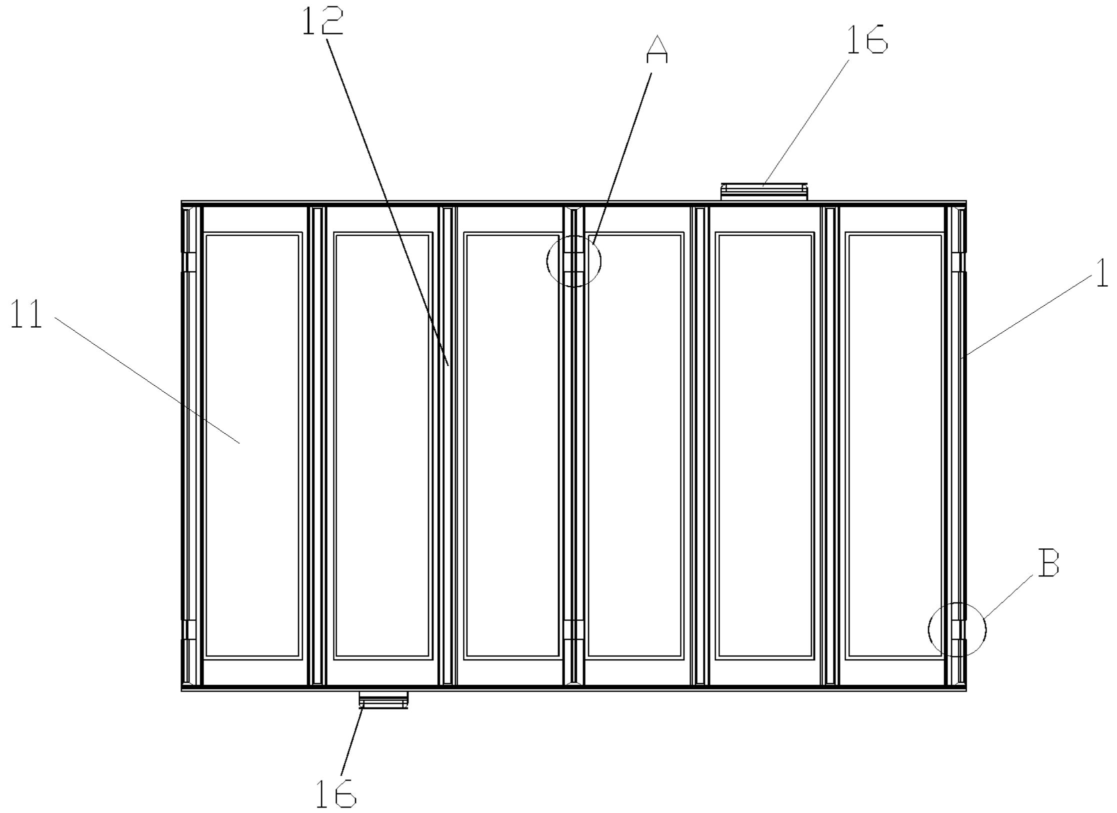
FIG. 4 shows the vertical-view structure of the solar desktop in the invention.
Figure 5:
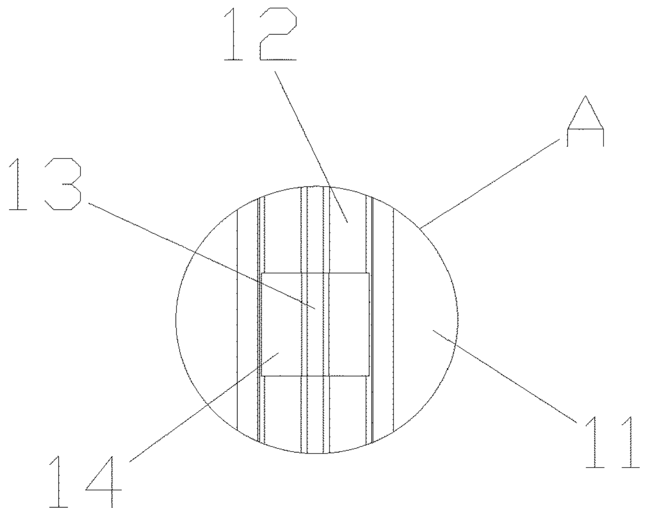
FIG. 5 shows the enlarged structure drawing at A in FIG. 4 of the invention.
Figure 6:
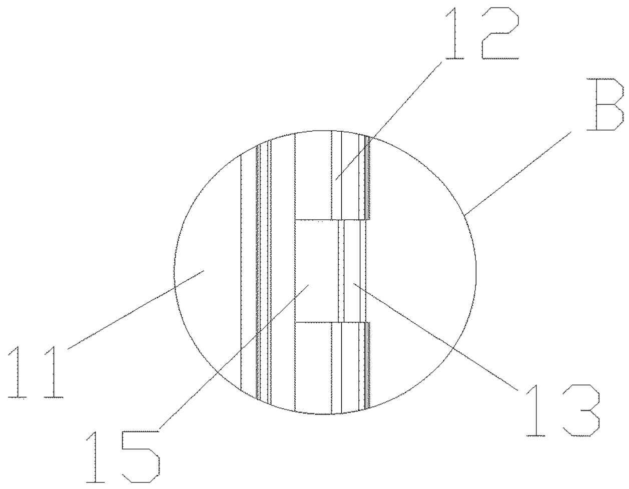
FIG. 6 shows the enlarged structure drawing at b in FIG. 4 of the invention.
Figure 7:
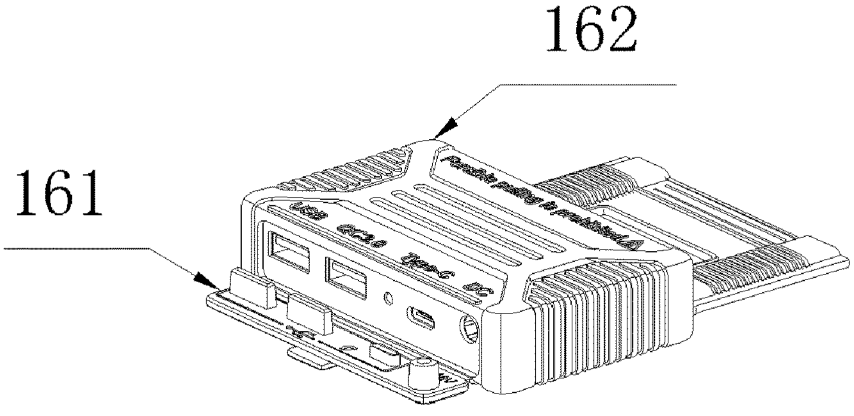
FIG. 7 shows the structure of the soft box body in the invention.
Figure 8:
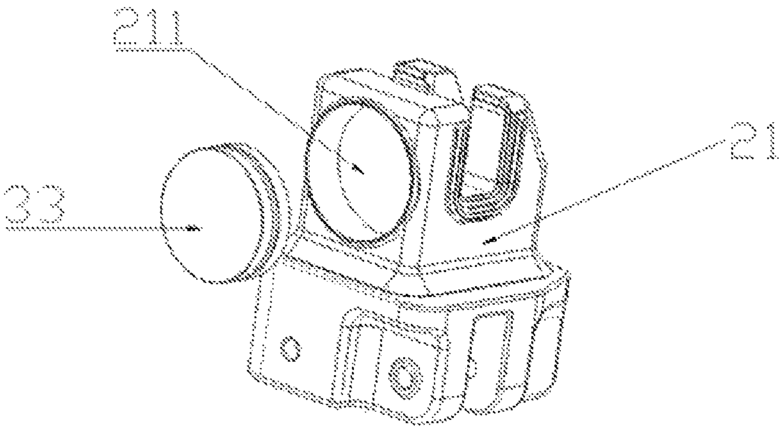
FIG. 8 shows the assemble principle between the direction designation device and the first assembly part.
Figure 9:
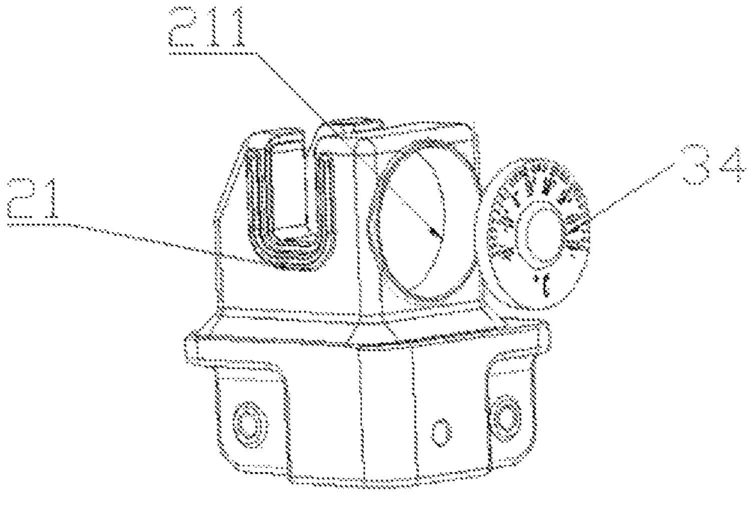
FIG. 9 shows the assemble principle between the temperature measuring device and the first assembly part.
Figure 10:
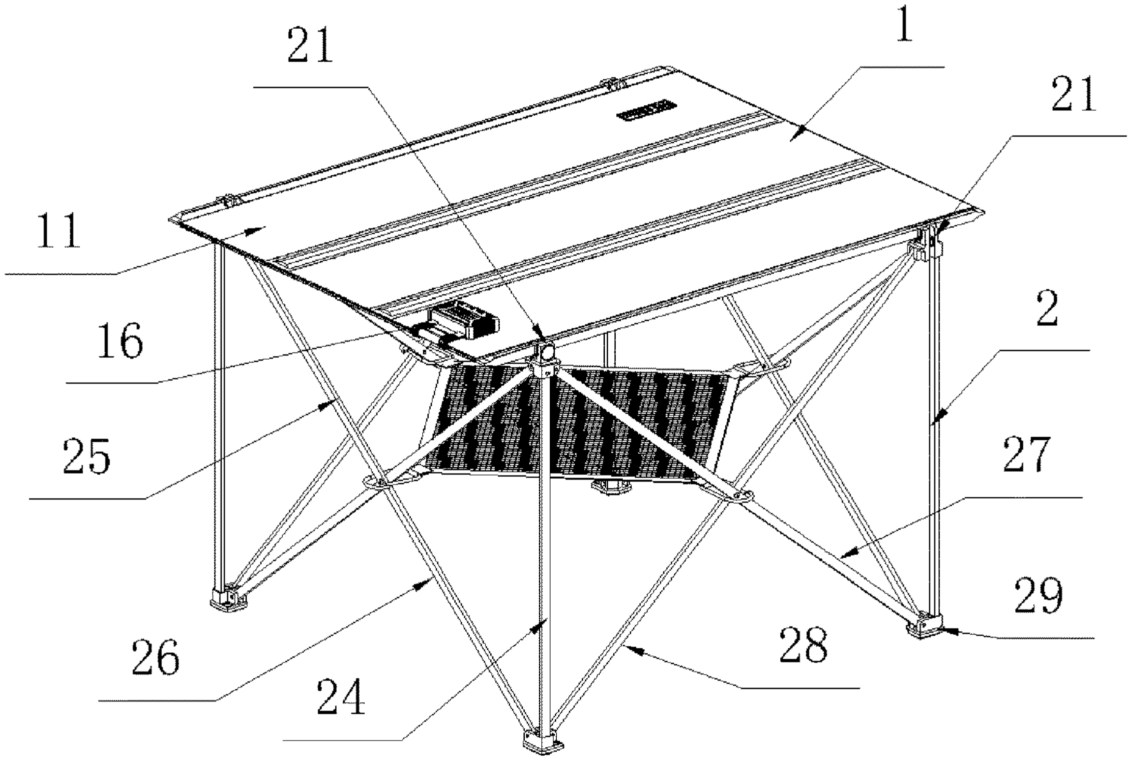
FIG. 10 shows the stereo structure of solar outdoor multifunctional folding table in the invention in the individually-assembled state.
Figure 11:
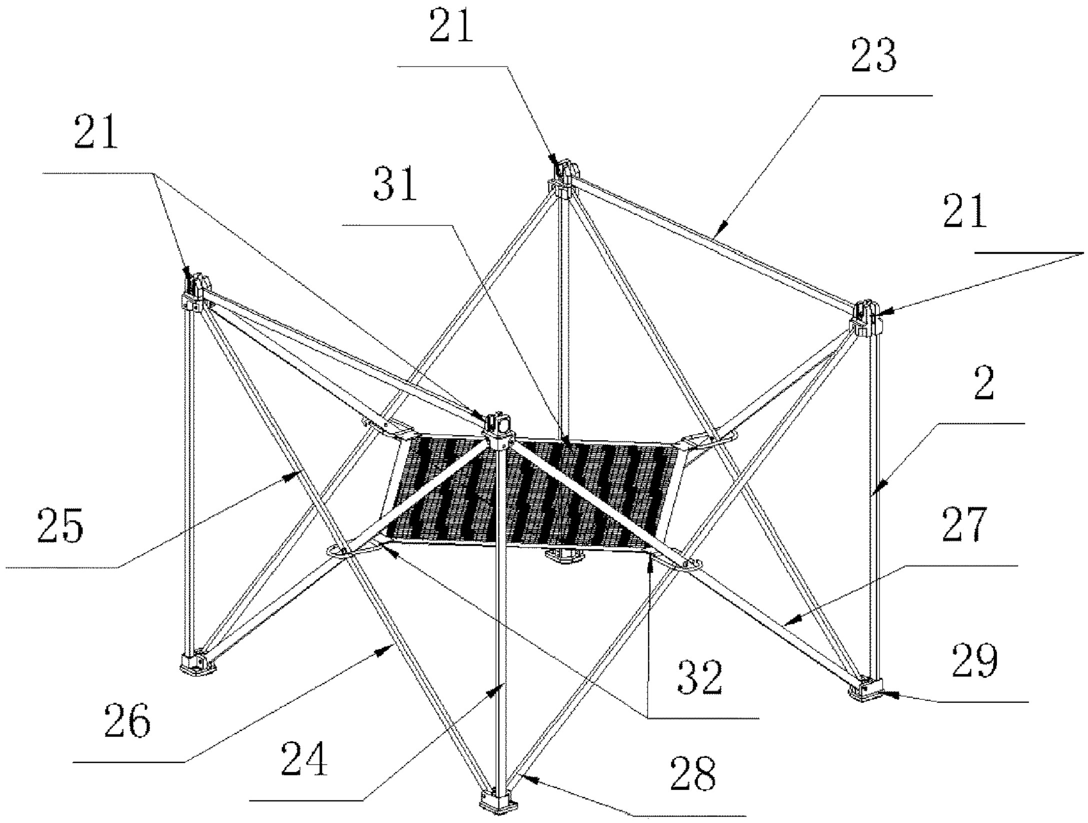
FIG. 11 shows the stereo structure of desktop support frame in the invention in the individually-assembled state.

As shown in FIG. 1-FIG. 11, a solar outdoor multifunctional folding table, comprising a solar desktop 1, a desktop support frame 2 for supporting the solar desktop 1, wherein the solar desktop 1 comprises a control output module 16, multiple photovoltaic panels 11 on the same horizontal plane, the adjacent photovoltaic panels 11 are hinged through articulation pieces, and the back of each photovoltaic panel 11 is attached with a fabric tablecloth, wherein an iron sheet is arranged in the fabric tablecloth; the control output module 16 comprises a control housing, a main control board, a converter, and an output port, and a soft box body 162 providing with a tab at one end, wherein the main control board and the converter are arranged in the control housing, and the output port is arranged on the surface of the control housing; and the control housing, the main control board, the converter, and the output port are all arranged inside the soft box body 162; one side of the soft box body 16 is hinged to the solar desktop 1; the surface of the soft box body 16 is provided with a magnet stone which is magnetically attached to the iron sheet in the fabric tablecloth; an opening of one end of the soft box body 16 is provided with a tab 161 that can be turned up and down, wherein the tab 161 and one side of the output port is provided with a convex section that is fully occluded with a concave section of the output port to achieve sealing; output end of multiple photovoltaic panels are connected to input end of the main control board, and output end of the main control board is connected to the output port through the converter; the solar desktop 1 is detachably arranged on the desktop support frame 2, and the fabric tablecloth is faced to the desktop support frame 2, one side of the desktop support frame 2 is provided with a temperature measuring device 34 and a direction designation device respectively 33; the desktop support frame 2 is individually assembled or multi-component assembled based on the solar desktop 1 composed of several hinged photovoltaic panels 11.

The soft box body 162 is made from flexible material, when not in use, the control output module 16 can be attached to the iron sheet in the fabric tablecloth through the magnet stone in the soft box body 162 to achieve the storage effect, that is, there will be no swing.

The soft box body 162 and fabric tablecloth are attached, wherein the control housing, the main control board, the converter, and the output port are all arranged in the soft box body 162, the opening end is provided with a tab 161 to achieve sealing, the tab 161 and one side of the output port is provided with a convex section that is fully occluded with a concave section of the output port to achieve sealing, which facilitates storage, and can prevent dust from entering into the control output module and causing it to fail to work normally.

Further, the articulation piece comprises hinges 12, and a hollow cavity is provided in the hinge 12, and an articulation rod 13 is arranged in the hollow cavity, wherein the hinge 12 is arranged on both sides of each photovoltaic panel 11, and the two adjacent sides of the two photovoltaic panels 11 share one hinge 12; wherein front and rear ends of the hinges 12 located on both sides of the solar desktop 1 are provided with first openings 15, and front and rear ends of the hinges 12 in the middle of the solar desktop 1 are provided with second openings 14; the desktop support frame 2 comprises first assembly parts 21 detachably equipped at the first openings 15 and sleeved on the articulation rod 13, and second assembly parts 22 detachably equipped at the second openings 14 and sleeved on the articulation rod 13, wherein the lower ends of the first assembly parts 21 and that of the second assembly parts 22 are provided with vertical rods 24 extending in the vertical direction, and the two sides of the second assembly parts 22 at front end of the solar desktop 1 are respectively connected with the two first assembly parts 21 at front end of the solar desktop 1 through horizontal rods 23 extending in the horizontal direction; the two sides of the second assembly parts 22 at rear end of the solar desktop 1 are respectively connected with the two first assembly parts 21 at rear end of the solar desktop 1 through horizontal rods 23 extending in the horizontal direction; and the horizontal rods 23 are arranged at bottom of the solar desktop 1.

In the embodiment, due to the characteristics of the hinges 12, multiple photovoltaic panels 11 can be folded and stored with each other, and the articulation rods 13 located in the hollow cavity can be used to assemble with the desktop support frame 2, which can increase the stability between photovoltaic panels 11, wherein the basic frame is constructed by the horizontal rods 23 and the vertical rods 24, and the solar desktop 1 is arranged on the desktop support frame 2, the horizontal rods 23 can support the bottom surfaces of multiple photovoltaic panels 11, which can realize the stabilization of photovoltaic panels 11.

Further, the desktop support frame 2 also comprises multiple third assembly parts 29, multiple first diagonal rods 25, multiple second diagonal rods 26, multiple third diagonal rods 27 and multiple fourth diagonal rods 28, the third assembly parts 29 are connected to the end of each vertical rod 24 away from the solar desktop 1, wherein the first assembly parts 21 and the second assembly parts 22 at the front end of the solar desktop 1 are all connected to the corresponding third assembly part 29 at the rear end of the solar desktop 1 through the first diagonal rods 25, the first assembly parts 21 and the second assembly parts 22 at the rear end of the solar desktop 1 are all connected to the corresponding third assembly part 29 at the front end of the solar desktop 1 through the second diagonal rods 26; two sides of the second assembly parts 22 at the front end of the solar desktop 1 are respectively connected to third assembly parts 29 at two sides of the front end of the solar desktop 1 through the third diagonal rods 27; two sides of the second assembly parts 22 at the rear end of the solar desktop 1 are respectively connected to the two third assembly parts 27 at rear end of the solar desktop 1 through the third diagonal rods 27; the third assembly part 29 in the middle of the front end of the solar desktop 1 is connected with the two first assembly parts 21 on two sides of the front end of the solar desktop 1 through the fourth diagonal rods 28; the third assembly part 29 in the middle of the rear end of the solar desktop 1 is connected with the two first assembly parts 21 on two sides of the rear end of the solar desktop 1 through the fourth diagonal rods 28.

Wherein, the first diagonal rods 25, the second diagonal rods 26, the third diagonal rods 27, the fourth diagonal rods 28 are constructed into a plurality of stable triangular structure, thereby the whole desktop support frame 2 is more stable, that is, after the horizontal rods 23 are removed, each vertical rod 24 can be pushed to the middle, and due to the first diagonal rods 25, the second diagonal rods 26, the third diagonal rods 27, the fourth diagonal rods 28 and the corresponding first assembly parts 21, the second assembly parts 22, the third assembly parts 29 are hinged with each other when assembling, that is, the folding and storage of the whole desktop support frame 2 can be realized, greatly reducing the occupation of space.

Further, the top end of the first assembly parts 21 and the top end of the second assembly parts 22 are provided with assembling slots for assembling with the articulation rods 13, and one side of the first assembly parts 21 and both sides of the upper end of the second assembly parts 22 are provided with the horizontal slots for assembling with the horizontal rods 23, the lower end of the first assembly parts 21 and the lower end of the second assembly parts 22 are both provided with vertical slots; wherein the back the first assembly parts 21 at front end of the solar desktop 1 and the back the second assembly parts 22 at front end of the solar desktop 1 are provided with first diagonal rod slots for assembling with first diagonal rods 25, wherein the surface of the first assembly parts 21 at rear end of the solar desktop 1 and the surface of the second assembly parts 22 at rear end of the solar desktop 1 are provided with second diagonal rod slots for assembling with the second diagonal rods 26, both sides of each second assembly part 22 are provided with third diagonal rod slots for assembling with the third diagonal rods 27, one side of each first assembly part 21 is provided with fourth diagonal rod slot for assembling with the fourth diagonal rods 28.

Further, the solar outdoor multifunctional folding table also comprises a bearing grid, the bearing grid comprises a bottom web 31 placed horizontally, multiple connection blocks 32, wherein one end of the connection blocks 32 is sleeved on the horizontal rods 23 or hanged on diagonal rods 27 by hooks, the other end of the connection blocks 32 is vertically connected to the bottom web 31. The bearing grid can be used as a drawer, which can place various articles on the surface of the bottom web 31.

Further, two or more first assembly parts 21 are provided with installation slot 211, wherein the temperature measuring device 34 is detachably arranged in the installation slot 211 on one of the first assembly parts 21, and the direction designation device 33 is arranged in any other installation slot 211 on one of the first assembly parts 21.

Further, the desktop support frame 2 comprises third assembly parts 29, multiple first diagonal rods 25, multiple second diagonal rods 26, multiple third diagonal rods 27 and multiple fourth diagonal rods 28, and the desktop support frame 2 is assembled individually or multi-component according to the solar desktop 1 composed of two or more photovoltaic panels 11 adjacent to each other.

The temperature measuring device 33 and the direction designation device 34 provided in the invention can allow users to intuitively real-time temperature and direction; and the temperature measuring device 24 in the invention can be disassembled from the installation slot 211 and used separately, which is more convenient and fast.

The above disclosed preferred embodiments of the invention are only used to describe the invention. Preferred embodiments do not specify all the details and do not limit the specific embodiments of the invention. Obviously, many modifications and changes can be made according to the contents of the specification. The embodiments are selected and specifically described in the specification for the purpose of better explaining the principle and practical application of the invention, thereby the technical personnel skilled in the art can well understand and use the invention. The invention is limited only by the claims and equivalents thereof

What is claimed is:

1. A solar outdoor multifunctional folding table, comprising a solar desktop, a desktop support frame for supporting the solar desktop, wherein the solar desktop comprises a control output module, multiple photovoltaic panels on the same horizontal plane, adjacent photovoltaic panels are hinged through articulation pieces, and the back of each photovoltaic panel is attached with a fabric tablecloth, the solar desktop is detachably arranged on the desktop support frame, and the fabric tablecloth is faced to the desktop support frame, wherein the desktop support frame is individually assembled based on the solar desktop composed of several hinged photovoltaic panels, wherein the control output module comprises a control housing, a main control board, a converter, and an output port, the main control board and the converter are arranged in the control housing, and the output port is arranged on the surface of the control housing; the outer surface of the control housing is covered with a soft box body, wherein one side of the soft box body is hinged to the solar desktop; the output end of multiple photovoltaic panels are connected to input end of the main control board, and the output end of the main control board is connected to the output port through the converter;

wherein the soft box body is made from flexible material, an opening of one end of the soft box body is provided with a tab that can be turned up and down, wherein the tab and one side of the output port is provided with a convex section that is fully occluded with a concave section of the output port to achieve sealing; an iron sheet is arranged in the fabric tablecloth, and the surface of the soft box body is provided with a magnet stone which is magnetically attached to the iron sheet in the fabric tablecloth.

2. The solar outdoor multifunctional folding table of claim 1, wherein one side of the desktop support frame is provided with a temperature measuring device and a direction designation device respectively.

3. The solar outdoor multifunctional folding table of claim 1, wherein the articulation piece comprises hinges, and a hollow cavity is provided in the hinge, and an articulation rod is arranged in the hollow cavity, wherein the hinge is arranged on both sides of each photovoltaic panel, and the two adjacent sides of the two photovoltaic panels share one hinge; wherein front and rear ends of the hinges located on both sides of the solar desktop are provided with first openings, and front and rear ends of the hinges in the middle of the solar desktop are provided with second openings; the desktop support frame comprises first assembly parts detachably equipped at the first openings and sleeved on the articulation rod, and second assembly parts detachably equipped at the second openings and sleeved on the articulation rod, wherein the lower ends of the first assembly parts and that of the second assembly parts are provided with vertical rods extending in the vertical direction, and the two sides of the second assembly parts at front end of the solar desktop are respectively connected with the two first assembly parts at front end of the solar desktop through horizontal rods extending in the horizontal direction; the two sides of the second assembly parts at rear end of the solar desktop are respectively connected with the two first assembly parts at rear end of the solar desktop through horizontal rods extending in the horizontal direction; and the horizontal rods are arranged at bottom of the solar desktop.

4. The solar outdoor multifunctional folding table of claim 3, wherein the desktop support frame also comprises multiple third assembly parts, multiple first diagonal rods, multiple second diagonal rods, multiple third diagonal rods and multiple fourth diagonal rods, the third assembly parts are connected to the end of each vertical rod away from the solar desktop, wherein the first assembly parts and the second assembly parts at the front end of the solar desktop are all connected to the corresponding third assembly part at the rear end of the solar desktop through the first diagonal rods, the first assembly parts and the second assembly parts at the rear end of the solar desktop are all connected to the corresponding third assembly part at the front end of the solar desktop through the second diagonal rods; two sides of the second assembly parts at the front end of the solar desktop are respectively connected to third assembly parts at two sides of the front end of the solar desktop through the third diagonal rods; two sides of the second assembly parts at the rear end of the solar desktop are respectively connected to the two third assembly parts at rear end of the solar desktop through the third diagonal rods; the third assembly part in the middle of the front end of the solar desktop is connected with the two first assembly parts on two sides of the front end of the solar desktop through the fourth diagonal rods; the third assembly part in the middle of the rear end of the solar desktop is connected with the two first assembly parts on two sides of the rear end of the solar desktop through the fourth diagonal rods.

5. The solar outdoor multifunctional folding table of claim 4, wherein the top end of the first assembly parts and the top end of the second assembly parts are provided with assembling slots for assembling with the articulation rods, and one side of the first assembly parts and both sides of the upper end of the second assembly parts are provided with the horizontal slots for assembling with the horizontal rods, the lower end of the first assembly parts and the lower end of the second assembly parts are both provided with vertical slots; wherein the back of the first assembly parts at the front end of the solar desktop and the back of the second assembly parts at front end of the solar desktop are provided with first diagonal rod slots for assembling with first diagonal rods, wherein the surface of the first assembly parts at rear end of the solar desktop and the surface of the second assembly parts at rear end of the solar desktop are provided with second diagonal rod slots for assembling with the second diagonal rods, both sides of each second assembly part are provided with third diagonal rod slots for assembling with the third diagonal rods, one side of each first assembly part is provided with a fourth diagonal rod slot for assembling with the fourth diagonal rods.

6. The solar outdoor multifunctional folding table of claim 5, wherein two or more first assembly parts are provided with installation slot, wherein the a temperature measuring device is detachably arranged in the installation slot on one of the first assembly parts, and the a direction designation device is arranged in any other installation slot on one of the first assembly parts.

7. The solar outdoor multifunctional folding table of claim 3, also comprises a bearing grid, the bearing grid comprises a bottom web placed horizontally, multiple connection blocks, wherein one end of the connection blocks is sleeved on the horizontal rods or hanged on diagonal rods by hooks, the other end of the connection blocks is vertically connected to the bottom web or hanged on diagonal rods at the other end by hooks.

8. The solar outdoor multifunctional folding table of claim 1, the fabric tablecloth is a high temperature resistant, waterproof and insulating material.

* * * * *